D. P. POWER.
EMERGENCY REPAIR DEVICE FOR VEHICLE SPRINGS.
APPLICATION FILED NOV. 10, 1908.
902,250.
Patented Oct. 27, 1908.
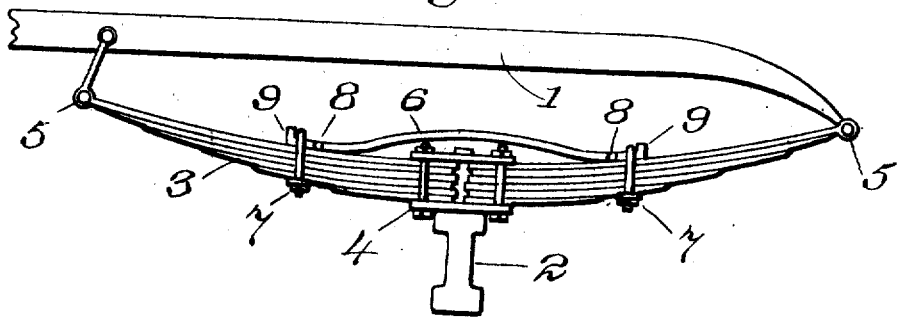
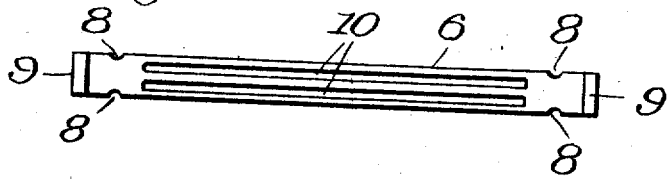
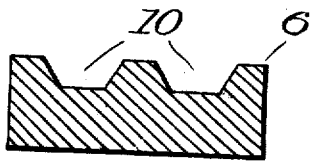
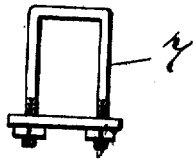
Witnesses:
J. B. Furman.
M. G. Crawford
Dudley P. Power
Inventor
By his Attorney J. H. Humphrey

UNITED STATES PATENT OFFICE.

DUDLEY PIERCE POWER, OF RIVERVALE, NEW JERSEY.

EMERGENCY REPAIR DEVICE FOR VEHICLE-SPRINGS.

No. 902,250.

Specification of Letters Patent.

Patented Oct. 27, 1908.

Application filed November 10, 1906. Serial No. 342,911.

*To all whom it may concern:*

Be it known that I, DUDLEY PIERCE POWER, a citizen of the United States of America, residing at Rivervale, county of Bergen, State of New Jersey, have invented certain new and useful Improvements in Emergency Repair Devices for Vehicle-Springs, of which the following is a specification.

My invention relates to vehicles in general and is designed to produce an emergency repair device for the body springs thereof.

In vehicles of the motor driven class, the breaking of the body springs is of frequent occurrence, owing to the great weight of the mechanism supported thereby and the high speed at which the vehicles are driven, regardless of the condition of the roads.

As such accidents usually result in hours of delay and other serious inconvenience, it is the object of the present invention to provide means by which a broken spring may be temporarily repaired in a ready and convenient manner without requiring the aid of skilled workmen or tools, other than an ordinary wrench.

A device suitable for carrying my invention into effect is illustrated in the accompanying drawings. I wish it understood, however, that I do not limit myself to the exact form, construction or arrangement of parts shown, as various changes may be made therein, without departing from the spirit and scope of my invention.

In the drawings, Figure 1 is a view in elevation showing the device applied to the broken body spring of a vehicle of the motor driven type. Fig. 2 is a side view of the device. Fig. 3 is a top plan view of the device. Fig. 4 is an enlarged cross section thereof, and Fig. 5 is a detail view of one of the clips by which the device is secured in position.

Referring now to the drawings, 1 represents a portion of the frame of a vehicle on which the body and driving mechanism are usually mounted, 2 the axle-bar or an I-bar carrying the axle bearings and 3, one of the body springs, which is interposed between the bar 2 and the frame 1, in the usual manner.

The spring rests upon and is secured to the bar 2 by a clip 4, and has its ends linked, pivoted or otherwise connected to the frame 1, as indicated at 5.

The arrangement of parts, as above described, is commonly employed in the design and construction of motor vehicles and serves herein merely to illustrate the application of my invention, which it will be understood, may be embodied in various other forms in order to adapt it to springs differently shaped and mounted.

From experience and observation, I have found that in the majority of instances, breaks resulting from the overstraining of body springs, occur directly above the point of support or within the clip by which the spring is secured to the axle. When thus broken, the spring immediately collapses and in making a temporary repair, it is first necessary to jack up the body of the vehicle, in order to reassemble the broken sections of the spring in the clip, which serves to hold them in line. As this may be accomplished ordinarily with little or no difficulty, it is the object of my invention to secure and maintain the parts thus assembled in operative relation, by uniting the broken sections in a manner to at once restore the effectiveness of the spring without greatly decreasing its resilience. For this purpose, I employ a bar or rod 6, preferably of non-resilient metal, which is so shaped and arranged as to bridge, straddle or otherwise extend over the break in the spring. Such bar or rod is then fastened to the spring sections at each side of the break by clips 7 or other suitable means, thus effectually securing the leaves of the spring as assembled within the axle clip.

In order to adapt the bar to springs of different widths, it is provided on opposite sides with notches 8, to receive clips of a size suitable for gripping the narrowest standard width of spring in common use and terminates in upturned lugs 9, forming stop-shoulders, which coöperate with clips of the full width of the bar or wider, as shown in Fig. 1.

As a means of reducing the weight as much as possible, the bar may be channeled, as indicated at 10 or otherwise formed.

In addition to the use as above described for making an emergency repair on a broken spring, the device is also capable of serving as a protector, when loosely secured upon the body springs, to prevent over straining of the same and may be employed in this manner if desired.

Having, therefore, described my invention, I claim:

1. The combination with a vehicle body spring and axle clip, of reinforcing means comprising spring engaging devices arranged at opposite sides of the clip, and a non-resilient member interposed between and connecting said devices.

2. The combination with a sectional body spring and axle clip, the sections of the spring being assembled end to end within the clip, of a non-resilient member arranged as a connection between the sections, and clamping means securing the member to the sections at opposite sides of the clip.

3. The combination with a sectional body spring and axle clip, the sections of the spring being arranged end to end within the clip, of a rigid tie-rod extending over the clip and secured to the sections.

4. An emergency repair device for uniting the broken ends of a spring maintained in position by a clip, comprising a non-resilient member having a portion intermediate its ends adapted to bridge the clip, and clamping means securing the member to the spring.

5. An emergency repair device for uniting the broken ends of a multiple leaf body spring, comprising means securing the leaves in assembled relation at each side of the break, and a rigid member maintaining an end to end relation between the broken sections.

6. An emergency repair device for uniting the broken ends of a multiple leaf body spring, comprising means maintaining the leaves in assembled relation at each side of the break, and a non-resilient member co-operating with said means to prevent endwise movement of the broken sections.

7. A device for repairing semi-elliptic vehicle springs, consisting of a substantially semi-elliptic tie-piece shorter than said spring, and means for fastening said tie-piece to said spring adjacent to a break in the spring.

8. A device for repairing semi-elliptic vehicle springs, consisting of a substantially semi-elliptic tie-piece shorter than said spring, and means for fastening said tie-piece to said spring adjacent to a break in the spring with the curve of the tie-piece disposed reversely to that of the spring.

9. A device for repairing semi-elliptic vehicle springs, consisting of a substantially semi-elliptic tie-piece shorter than said spring and having stops near its ends, and means for engaging said stops and fastening said tie-piece at a plurality of points to said spring adjacent to a break in the spring.

10. A device for repairing semi-elliptic vehicle springs, consisting of a substantially semi-elliptic tie-piece shorter than said spring and having stops near its ends, and clips for engaging said stops and straddling said tie-piece and spring at a plurality of points adjacent to a break in the spring to fasten said parts together.

In testimony whereof, I affix my signature, in the presence of two witnesses.

DUDLEY PIERCE POWER.

Witnesses:
W. H. PUMPHREY,
M. G. CRAWFORD.